United States Patent
Kim et al.

(10) Patent No.: US 10,317,984 B2
(45) Date of Patent: Jun. 11, 2019

(54) SYSTEM ON CHIP, METHOD OF MANAGING POWER THEREOF, AND ELECTRONIC DEVICE

(71) Applicant: SAMSUNG ELECTRONICS CO., LTD., Suwon-si (KR)

(72) Inventors: Tae-woo Kim, Daejeon (KR); Dong-jin Lee, Suwon-si (KR); Ki-seon Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 14/983,809

(22) Filed: Dec. 30, 2015

(65) Prior Publication Data

US 2016/0216752 A1 Jul. 28, 2016

(30) Foreign Application Priority Data

Jan. 23, 2015 (KR) .......................... 10-2015-0011253

(51) Int. Cl.
*G06F 1/00* (2006.01)
*G06F 1/26* (2006.01)
(Continued)

(52) U.S. Cl.
CPC .............. *G06F 1/329* (2013.01); *G06F 1/324* (2013.01); *G06F 1/3243* (2013.01);
(Continued)

(58) Field of Classification Search
CPC ...................................... G06F 1/32; G06F 1/26
See application file for complete search history.

(56) References Cited

U.S. PATENT DOCUMENTS 7,117,378 B1 * 10/2006 Maksimovic ......... G06F 1/3203
713/300
7,587,525 B2 * 9/2009 Dahan ................... G06F 1/3215
710/22

(Continued)

FOREIGN PATENT DOCUMENTS

CN 101689072 A 3/2010
GB 2457171 A 8/2009
(Continued)

OTHER PUBLICATIONS

Communication dated Jun. 2, 2016, from the European Patent Office in counterpart European Application No. 16151246.2.
(Continued)

*Primary Examiner* — Phil K Nguyen
(74) *Attorney, Agent, or Firm* — Sughrue Mion, PLLC

(57) ABSTRACT

A system on chip includes an event manager configured to receive an event from an external source, an event analyzer configured to analyze the event received by the event manager to determine a voltage, a frequency, and power gating corresponding to the analyzed event, a power manager configured to set power on or off and to set a voltage, a clock manager configured to set a clock frequency, a power gating (PG) manager configured to set power gating, a main controller configured to include at least one modules and a central processing unit (CPU), and a wakeup controller configured to control the power manager, the clock manager, and the PG manager, to transmit power having a starting voltage and a clock signal having a starting clock frequency, and to transmit a power gating signal to apply power only to one of the at least one modules operating so as to start the main controller.

12 Claims, 11 Drawing Sheets

(51) Int. Cl.
*G06F 1/32* (2019.01)
*G06F 1/329* (2019.01)
*G06F 1/324* (2019.01)
*G06F 1/3234* (2019.01)
*G06F 1/3287* (2019.01)
*G06F 1/3296* (2019.01)

(52) U.S. Cl.
CPC .......... *G06F 1/3287* (2013.01); *G06F 1/3296* (2013.01); *Y02B 60/1217* (2013.01); *Y02B 60/1239* (2013.01); *Y02B 60/1282* (2013.01); *Y02B 60/1285* (2013.01); *Y02D 10/126* (2018.01); *Y02D 10/152* (2018.01); *Y02D 10/171* (2018.01); *Y02D 10/172* (2018.01)

(56) References Cited

U.S. PATENT DOCUMENTS

| | | |
|---|---|---|
| 7,971,086 B2 | 6/2011 | Itkin |
| 8,689,021 B1 | 4/2014 | Bai et al. |
| 2007/0030047 A1* | 2/2007 | Akasaka .................. G06F 1/04 327/291 |
| 2008/0189563 A1 | 8/2008 | Itkin |
| 2008/0263482 A1 | 10/2008 | Jin et al. |
| 2009/0259863 A1 | 10/2009 | Williams et al. |
| 2009/0282232 A1* | 11/2009 | Ugokwe ............... G06F 9/4401 713/2 |
| 2010/0174933 A1* | 7/2010 | Lu ........................ G06F 1/3203 713/324 |
| 2010/0313050 A1 | 12/2010 | Harrat et al. |
| 2011/0043275 A1 | 2/2011 | Fuks et al. |
| 2012/0102344 A1* | 4/2012 | Kocev .................. G06F 1/3237 713/322 |
| 2012/0131356 A1* | 5/2012 | Han ........................ G06F 1/324 713/300 |
| 2012/0151426 A1* | 6/2012 | Marrou ................. G06F 17/505 716/109 |
| 2012/0159496 A1* | 6/2012 | Dighe ................... G06F 9/4893 718/102 |
| 2013/0090777 A1* | 4/2013 | Lu ............................. H02J 3/14 700/297 |
| 2014/0068285 A1 | 3/2014 | Lee et al. |
| 2014/0075224 A1 | 3/2014 | Lee et al. |
| 2014/0089697 A1 | 3/2014 | Kim et al. |
| 2014/0139024 A1 | 5/2014 | Yun et al. |
| 2015/0067214 A1* | 3/2015 | Henry ................... G06F 1/3237 710/261 |
| 2017/0192475 A1* | 7/2017 | Fujimoto ................ G06F 1/266 |

FOREIGN PATENT DOCUMENTS

| | | |
|---|---|---|
| KR | 10-2014-0029721 A | 3/2014 |
| KR | 10-2014-0033663 A | 3/2014 |
| KR | 10-2014-0066810 A | 6/2014 |

OTHER PUBLICATIONS

Communication dated Mar. 21, 2018 issued by the State Intellectual Property Office of P.R. China in counterpart Chinese Patent Application No. 201610044939.7.
Communication dated Dec. 18, 2018, from the European Patent Office in counterpart European Application No. 16151246.2.
Communication dated Nov. 27, 2018, from the State Intellectual Property Office of People's Republic of China in counterpart Application No. 201610044939.7.

* cited by examiner

SYSTEM ON CHIP, METHOD OF MANAGING POWER THEREOF, AND ELECTRONIC DEVICE

CROSS-REFERENCE TO RELATED APPLICATIONS

This application claims priority from Korean Patent Application No. 10-2015-0011253, filed on Jan. 23, 2015, in the Korean Intellectual Property Office, the disclosure of which is incorporated herein by reference in its entirety.

BACKGROUND

1. Field

Apparatuses and methods consistent with the exemplary embodiments relate to a system on chip (SoC), a method of managing power thereof, and an electronic device, and more particularly, to a SoC that operates without the intervention of an operating system (OS) to reduce power consumption, a method of managing power thereof, and an electronic device.

2. Description of the Related Art

The recent development of electronic technologies has launched various types of mobile devices. A core technology of mobile products, such as a smartphone, a smart watch, etc., is the technology of realizing low power. In particular, the technology of realizing low power in a wearable device is important because of the limited size of a wearable device and the small battery capacity resulting from this.

In order to secure a maximum use time from a battery, a recent mobile application processor (AP) is designed so as to distribute tasks and lower an operation frequency by using a dual core, a quadruple core, or the like. Also, an operating system (OS) uses a dynamic voltage and frequency scaling (DVFS) technology of checking a load and frequency of a task to manage hardware. In particular, although the DVFS technology processes the same task, the DVFS technology reflects manufacturing characteristics of AP chips depending on a semiconductor process and thus manages voltages and frequencies of the AP chips differently.

FIG. 1 illustrates a method of starting a system on chip (SoC). As shown in FIG. 1, if an event occurs according to a demand of a user, sensor, or the like, a wakeup manager wakes up a system at a set frequency and voltage. Thereafter, an OS starts and an application program is executed by software. Simultaneously, a power management program for designating a voltage and a frequency, etc., operates to designate a voltage level and a frequency by using a hardware state information provider logic (i.e., a bus monitor, a chip performance monitor, a temperature, or the like) in order to determine an operation load provided from the hardware. Also, power gating of an internal function block is determined according to the event. A power management integrated circuit (PMIC) is set by using a peripheral device interface to control a voltage. This operation is repeated until the application program is completed and limits a call cycle to limit a frequent call of a power manager.

The software operation as described above may take from several milliseconds (ms) to hundreds of milliseconds (ms), and the load on the software increases due to repeated branching. In particular, an event of a predictable task (e.g., a time change, a letter notification, a BLUETOOTH® connection check, or the like) frequently occurs in a mobile product. If power and a frequency are controlled due to an intervention (or a determination) of software, even when a task taking a short time is performed, the time taken for determining the task is actually longer than the time taken for processing the task.

SUMMARY

Exemplary embodiments may overcome the above disadvantages and other disadvantages not described above. Also, the exemplary embodiments are not required to overcome the disadvantages described above, and certain exemplary embodiments may not overcome any of the problems described above.

There is provided a system on chip (SoC) that automatically sets power, an operation frequency, etc. of a predictable task through a low power controller and then wakes up a main system to complete a necessary operation within a short time without an intervention of software so as to improve a consumed current, a method of managing power thereof, and an electronic device.

A low power controller may be realized according to various methods. For example, the low power controller may be realized as hardware, software based on a very low power central processing unit (CPU), etc. A function block may be described to assist understanding of the exemplary embodiments, but is not limited thereto.

According to an aspect, a system on chip (SoC) includes an event manager configured to receive an event from an external source, an event analyzer configured to analyze the event received by the event manager to determine a voltage, a frequency, and power gating corresponding to the analyzed event, a power manager configured to set power on or off and to set a voltage, a clock manager configured to set a clock frequency, a power gating (PG) manager configured to set power gating, a main controller configured to include at least one modules and a central processing unit (CPU), and a wakeup controller configured to control the power manager to set the determined voltage to a starting voltage, control the clock manager to set the determined frequency to a starting clock frequency, control the PG manager to set the determined power gating, transmit power having the starting voltage and a clock signal having the starting clock frequency, and transmit a power gating signal to apply power only to one of the at least one modules operating so as to start the main controller.

The SoC may further include a parameter storage unit configured to store information preset for the event. The event analyzer may analyze the event by using the preset information stored in the parameter storage unit.

The present information may include at least one selected from a minimum voltage, a minimum frequency, and power gating necessary for performing an operation corresponding to each event.

The event may be at least one selected from a timer event, a sensor event, a communication connection event, and a message event input by a user or a sensor.

The wakeup controller may determine whether the power transmitted to the main controller is stabilized so as to have the starting voltage and, in response to the power being determined as being stabilized, transmit a clock signal having the starting clock frequency to the main controller.

The main controller may execute an operating system (OS) of the SoC by using the transmitted power and clock signal.

According to another aspect of an exemplary embodiment, a method of managing power of a SoC includes, in response to an event being input from an external source, analyzing the input event to determine a voltage, a frequency, and power gating corresponding to the analyzed event, setting the determined voltage to a starting voltage, setting a starting clock frequency and power gating according to the determined frequency and whether each module operates, and transmitting power having the starting voltage, a clock signal having the starting clock frequency, and a power gating signal to a main controller to start the main controller.

The method may further include storing information preset for the event. The determining of the voltage, the frequency, and the power gating may include analyzing the input event by using the stored preset information.

The event may be at least one selected from a timer event, a sensor event, a communication connection event, and a message event input by a user or a sensor based on mobile device or wearable device usage scenarios.

The preset information may include at least one selected from a minimum voltage, a minimum frequency, and power gating necessary for performing an operation corresponding to each event. Besides the present information, corresponding information about the event may be included.

The starting of the main controller may include determining whether the power transmitted to the main controller is stabilized so as to have the starting voltage, and in response to the power being determined as being stabilized, transmitting a clock signal having the starting clock frequency to the main controller.

The starting of the main controller may further include executing an OS of the SoC through the main controller by using the transmitted power and clock signal.

According to an aspect of an exemplary embodiment, an electronic device includes a power supply unit configured to supply power to a SoC, and the SoC configured to control the electronic device. The SoC may include an event manager configured to receive an event from an external source, an event analyzer configured to analyze the event received by the event manager to determine a voltage, a frequency, and power gating corresponding to the analyzed event, a power manager configured to set power on or off and to set a voltage, a clock manager configured to set a clock frequency, a power gating (PG) manager configured to set power gating, a main controller configured to comprise at least one modules and a CPU, and a wakeup controller configured to control the power manager to set the determined voltage to a starting voltage, control the clock manager to set the determined frequency to a starting clock frequency, control the PG manager to set the determined power gating, transmit power having the starting voltage and a clock signal having the starting clock frequency to the main controller, and transmit a power gating signal to apply power only to one of the at least one modules operating so as to start the main controller.

According to various exemplary embodiments as described above, in response to a task operating within a short time, being processed, a consumed current may be reduced. Small hardware or software that maintains an existing dynamic voltage and frequency scaling (DVFS) configuration and enables a low power operation for a predefined event may be added to maximize a use time of a device.

According to another aspect of an exemplary embodiment, there is provided a method of managing power, including receiving a task request corresponding to a task, the task corresponding to a task voltage, a task frequency, a task clock gating, and a task power gating; determining, by a low power controller, the task voltage, the task clock frequency, the task clock gating, and the task power gating corresponding to the task; waking, by the low power controller, a main controller from a system sleep state, the waking including: transmitting power having the task voltage to the main controller; transmitting a clock signal having the task frequency to the main controller; transmitting a clock gating signal corresponding to the task clock gating to the main controller; and transmitting a power gating signal corresponding the task power gating to the main controller; and performing the task in accordance with the task voltage, the task clock frequency, the task clock gating, and the task power gating, wherein at least one of the task voltage, the task frequency, the task clock gating, and the task power gating corresponds to a minimum value for the performing the task.

The transmitting the power may include transmitting a voltage level control signal to a power supply unit so as to enable the power supply unit to transmit power having the task voltage to the main controller.

Additional and/or other aspects of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by describing certain exemplary embodiments with reference to the accompanying drawings, in which.

Figure 6A:
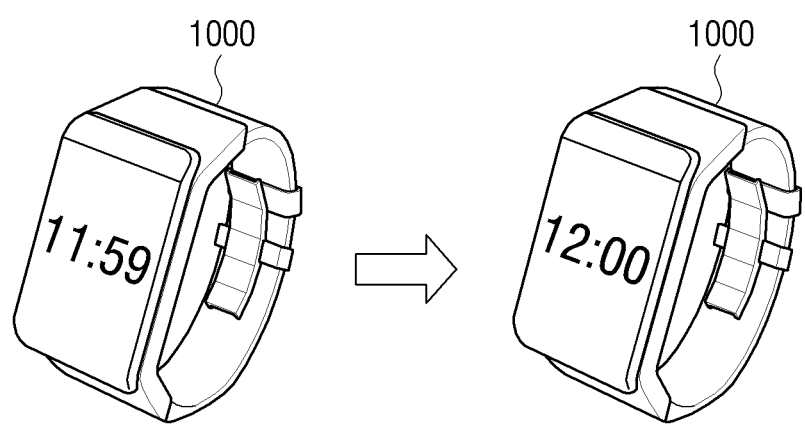
Figure 6B:
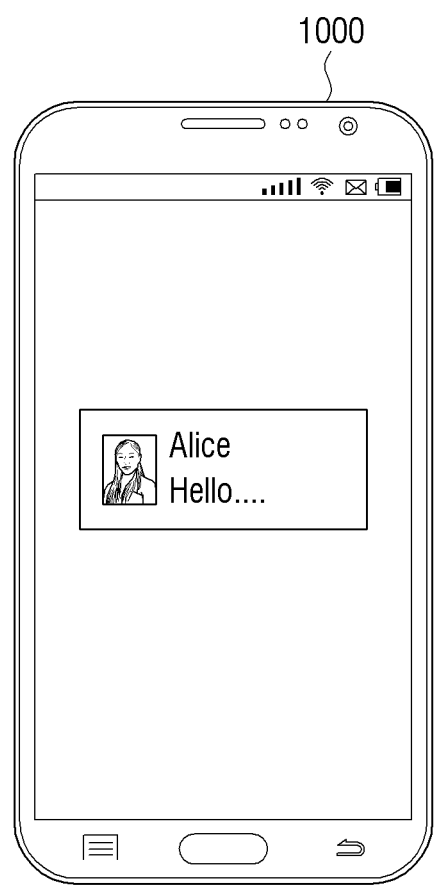
Figure 6C:
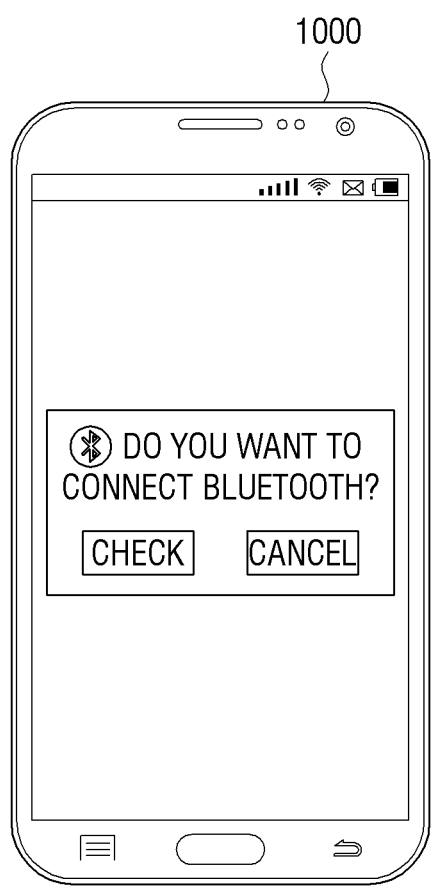
Figure 6D:
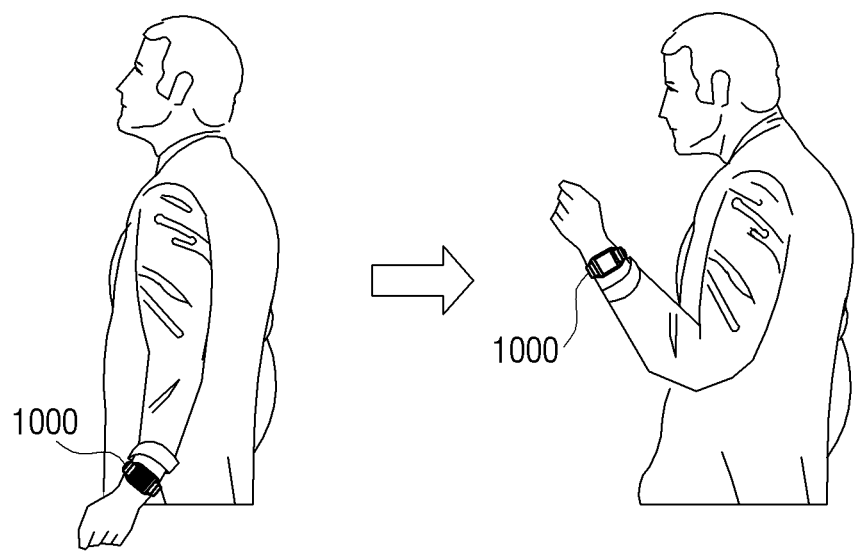
Figure 7:
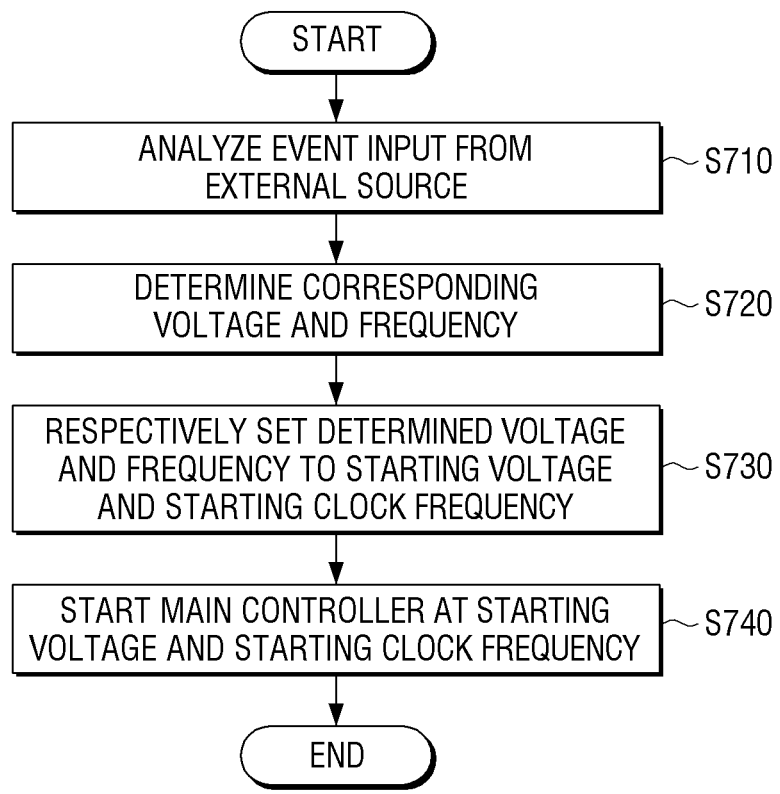
Figure 8:
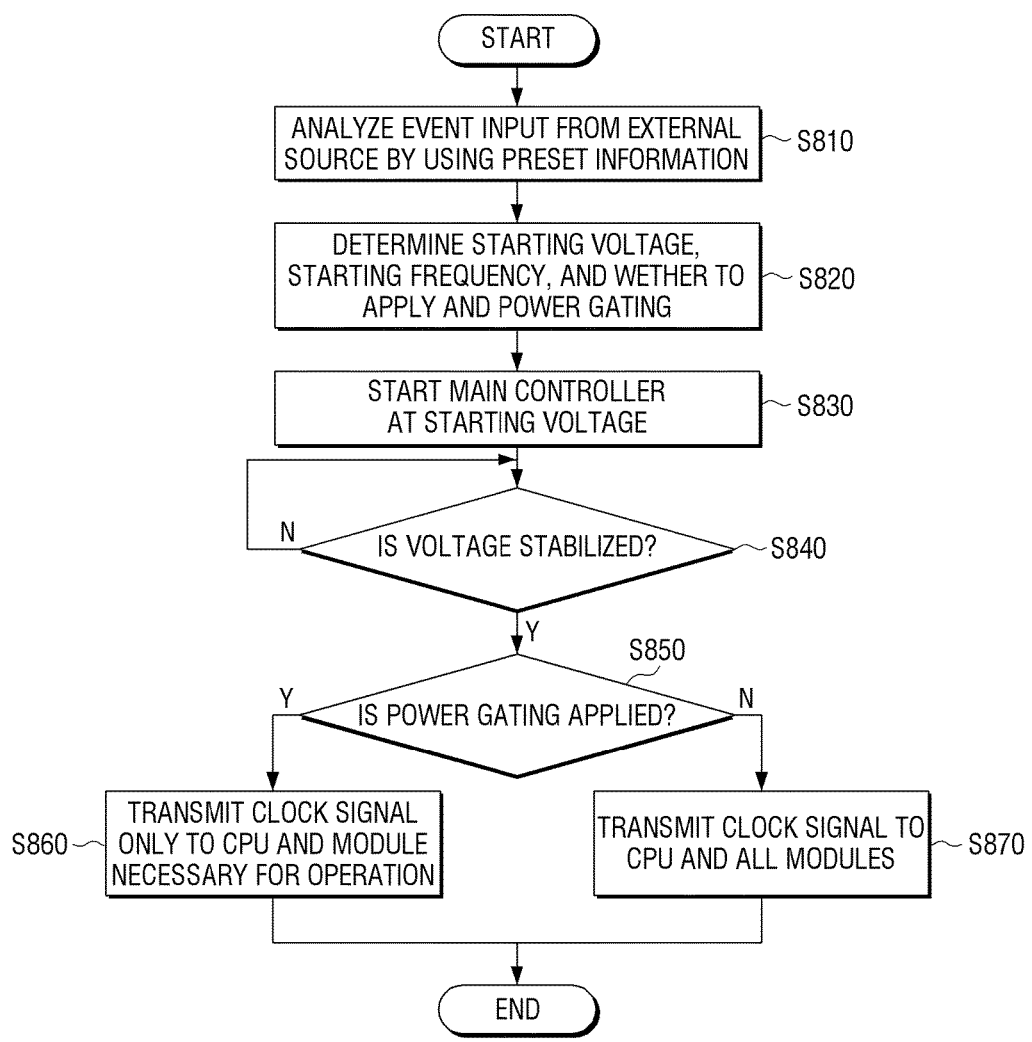

FIGS. 6A, 6B, 6C, and 6D illustrate events that are input into an SoC, according to an exemplary embodiment; and FIGS. 7 and 8 are flowcharts of a method of managing power of a SoC, according to various exemplary embodiments.

DETAILED DESCRIPTION OF THE EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail because they would obscure the disclosure with unnecessary detail.

The terms used in the present application are only used to describe the exemplary embodiments, and are not intended to limit the scope of the disclosure. The singular expression also includes the plural meaning, as long as it does not have a different mean in context thereof. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Figure 1:
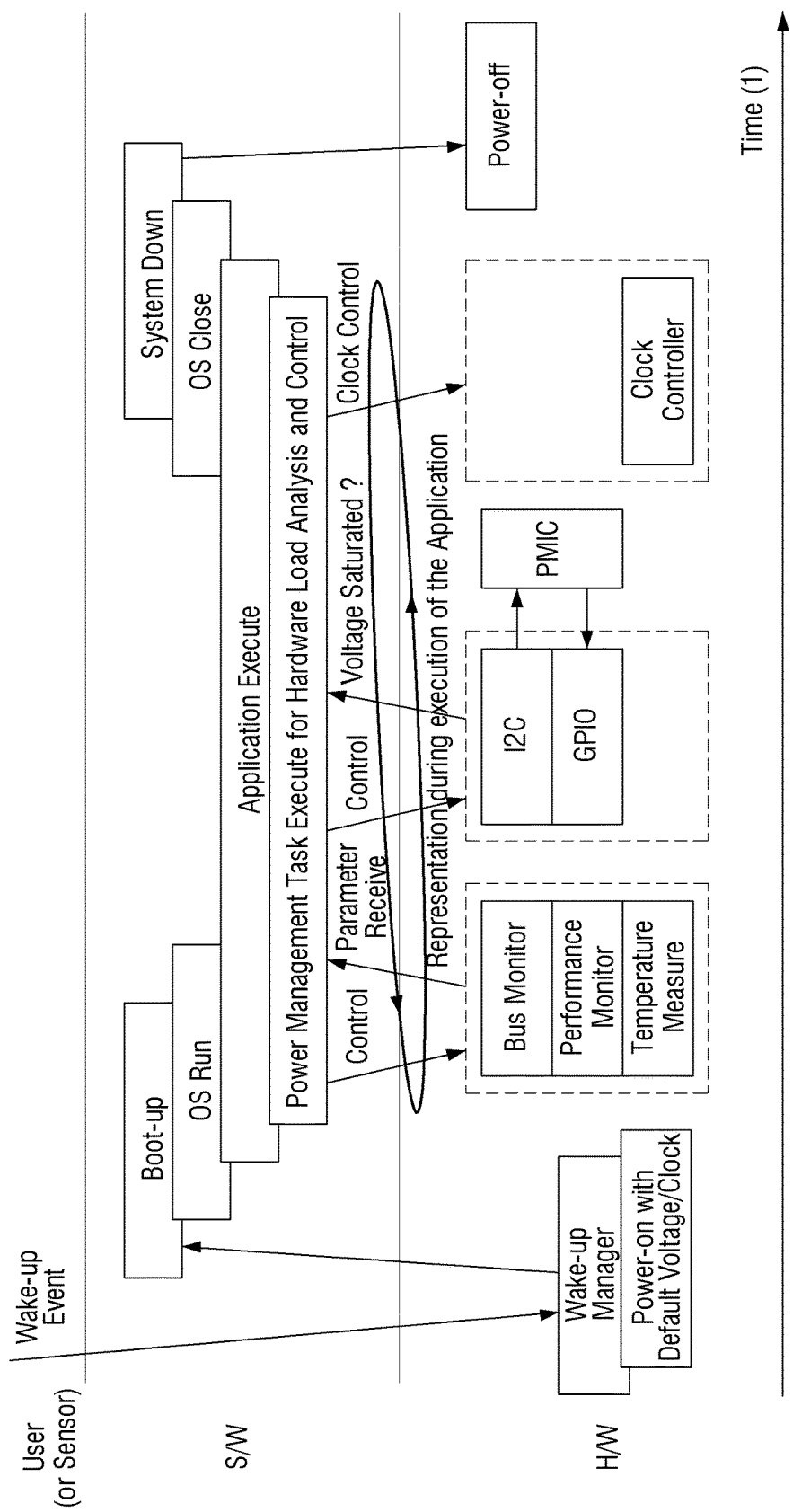
FIG. 1 illustrates a method of managing power of an existing system on chip (SoC) according to an exemplary embodiment.
Figure 2:
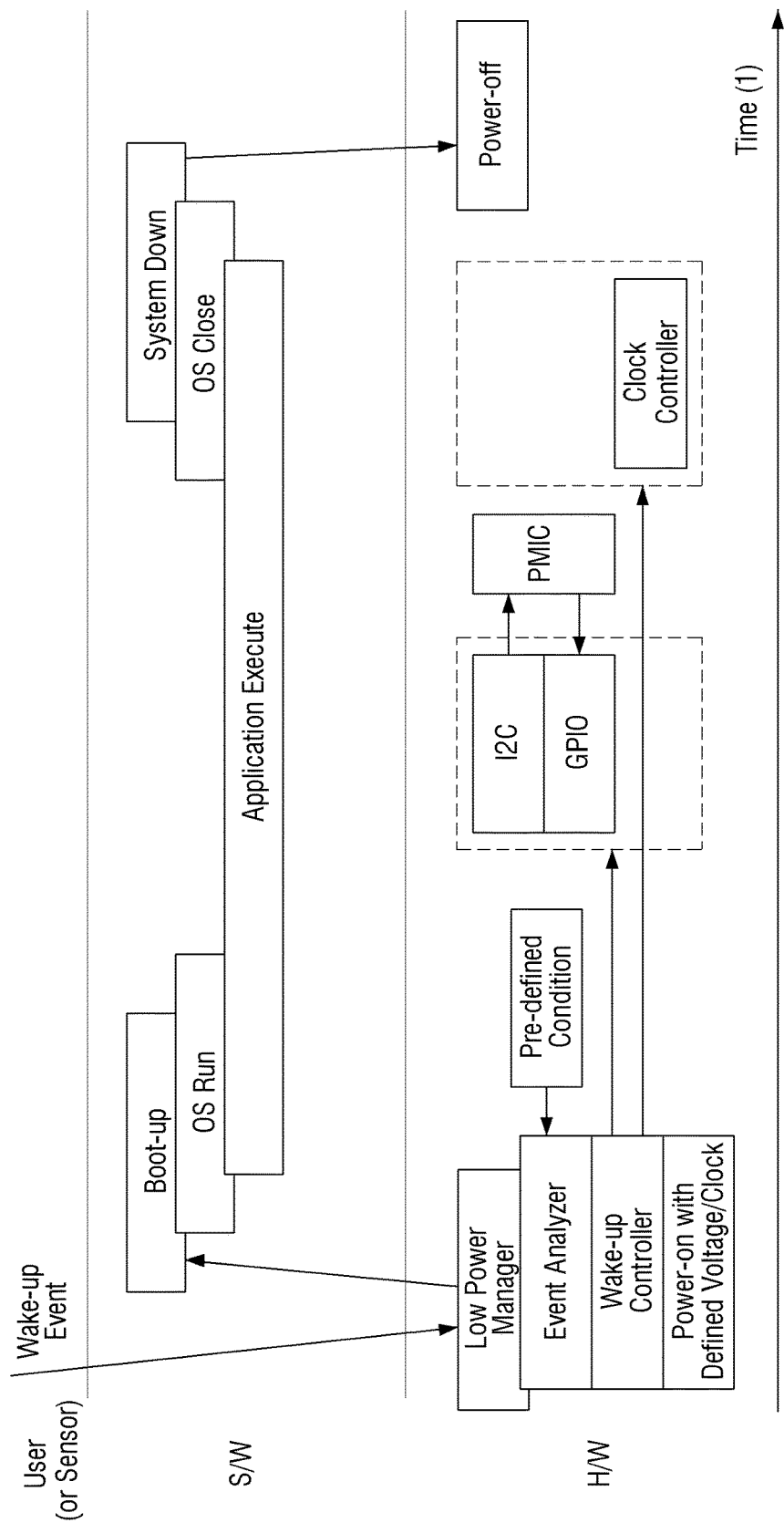
FIG. 2 illustrates a method of managing power of an SoC according to an exemplary embodiment.

FIG. 2 illustrates an aspect of an exemplary embodiment in comparison with a related art. Referring to FIG. 2, if an event is input by a user, a sensor, or the like, a low power controller (or low power manager) operates an event analyzer. The event analyzer checks a corresponding event condition in a predefined condition, sets a Power Management Integrated Circuit (PMIC) according to a predefined set value, sets frequency power gating, and wakes up a main system to operate an application program. The application program that operates completes a task.

In other words, when a system on chip (SoC) is woken up by a wakeup event (e.g., a timer event, a sensor event, a communication connection event of BLUETOOTH®/WIFI®/LTE® or the like, a message event, or the like) from a system sleep situation (or in a SoC power off situation), a work load may be predefined in an operation, which may be processed by the SoC, according to each characteristic of the event. Here, initial power of the SoC that is to be operated by the low power controller may be controlled so as to enable the SoC to perform a task in an optimum state appropriate for the work load when the SoC wakes up.

Figure 3:
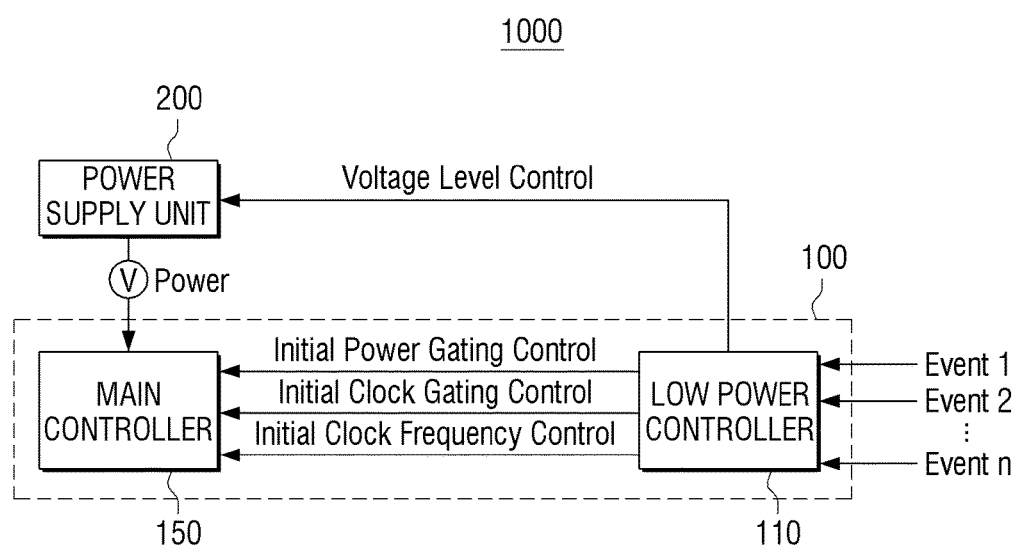
FIG. 3 is a schematic block diagram of an operation of an electronic device according to an exemplary embodiment.

FIG. 3 is a block diagram of a structure of an electronic device 1000 according to an exemplary embodiment. Referring to FIG. 3, the electronic device 1000 includes a SoC 100 and a power supply unit 200. If an event is input into the SoC 100, a low power controller 110 determines and then sets a voltage, a frequency, clock gating, and power gating of the corresponding event to start a main controller 150.

The clock gating is one of the power saving technologies. The clock gating is provided from a logic circuit that can provide or cut a clock (frequency). If an operation of a particular circuit is not needed, power is not supplied to the particular circuit so as to eliminate the need for the particular circuit to change a state thereof. Therefore, switching power consumption becomes 0, and only the power supplied by a leakage current is consumed. Power consumption is proportional to a frequency, and thus if the frequency is set to 0, the switching power consumption may be 0. The clock gating may be described as a particular case where an operation frequency is set to 0 in dynamic voltage and frequency scaling (DVFS).

The power gating is one of the technologies of supplying power only to the module necessary for executing a particular application program. For example, the main controller 150 may include modules A, B, C, D, and E, and only the modules A, B, and C may be used when a messenger application program is executed. In this case, if power is supplied to all of the modules A, B, C, D, and E, the modules D and E consume unnecessary power. Therefore, if a module that pre-operates is known, power may be selectively supplied only to a module necessary for operation, through the power gating.

The low power controller 110 transmits a voltage level control signal to the power supply unit 200 so as to enable the power supply unit 200 to supply power to the main controller 150 at the determined voltage. Also, the low power controller 110 transmits an operation clock frequency, an operation clock gating start control signal, and an operation power gating start control signal to the main controller 150. Detailed structure and operation of the SoC 100 will be described below.

The power supply unit 200 supplies power to the SoC 100. For example, the power supply unit 200 may be realized as a PMIC. The power supply unit 200 may supply power to the SoC 100 having a voltage that is set by and transmitted from the SoC 100.

Figure 4:
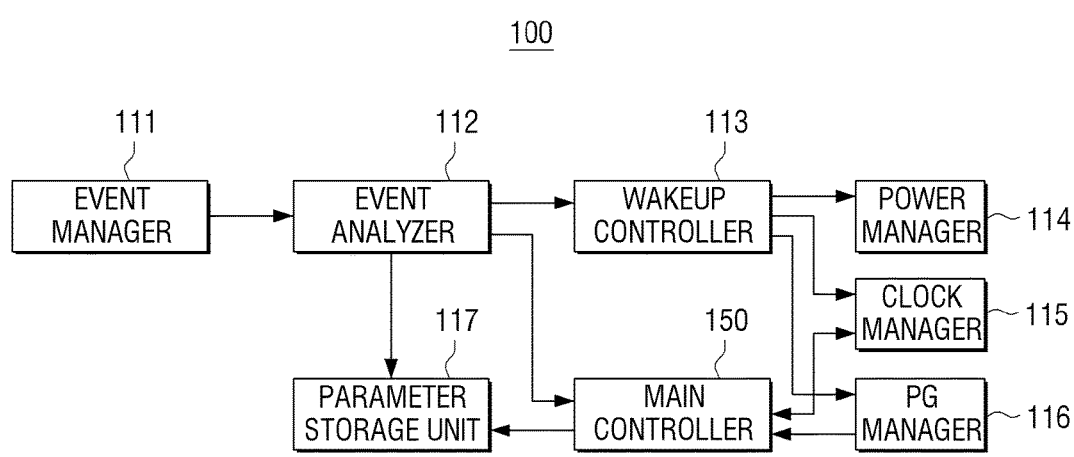
FIG. 4 is a schematic block diagram of a structure of an SoC according to an exemplary embodiment.

FIG. 4 is a schematic block diagram of a structure of a SoC 100 according to an exemplary embodiment. Referring to FIG. 4, the SoC 100 includes: a low power controller 110 including an event manager 111, an event analyzer 112, a wakeup controller 113, a power manager 114, a clock manager 115, a power gating (PG) manager 116, and a parameter storage unit 117; and a main controller 150. For example, the SoC 100 may be realized as an integrated circuit (IC) into which several function blocks are integrated to form a given system function as one chip. In general, the SoC 110 may include a digital block, such as an embedded microprocessor, a memory, a peripheral device for a connection to an external system, an accelerating function block, a data transmission block, or the like, a radio frequency (RF) block, a microelectromechanical system (MEMS) block, and the like.

Also, the low power controller 110 may be realized according to various methods, e.g., may be hardware, software based on a low power central processing unit (CPU), or the like. The low power controller 110 will be described as a function block according to an exemplary embodiment, but is not limited thereto.

The event manager 111 receives an event from an outside of the SoC 100. For example, if a plurality of events is sequentially input, the event manager 111 may store the plurality of events and sequentially transmit the plurality of events to the wakeup controller 113 and the event analyzer 112. An event may be a request signal for asking the SoC 100 to wake up and perform a particular operation. For example, the event may be at least one selected from a timer event, a sensor event, a communication connection event, and a message event. The respective events will be described in detail below.

The event analyzer 112 determines a preset power level, a frequency, and a power gating module for the received event and requires the parameter storage unit 117 for this.

The wakeup controller 113 controls an overall operation of the SoC 100 when the SoC 100 starts. According to an exemplary embodiment, the wakeup controller 113 finally determines a voltage and a frequency corresponding to an analyzed event. The wakeup controller 113 may also control the power manager 114 to set the determined voltage to a starting voltage. The wakeup controller 113 may control the clock manager 115 to set the determined frequency to a starting clock frequency and control the PG manager 116 to manage power gating according to a determined operation module. The wakeup controller 113 transmits a signal, such as power having the starting voltage, a starting clock frequency, power gating, or the like, to start the main controller 150.

The power manager 114 sets power on and off and sets a voltage. For example, the power manager 114 may set power on or off according to power rails. Therefore, the power manager 114 may supply power only to a power rail necessary for an operation to prevent useless power consumption.

The clock manager 115 controls a clock frequency of the SoC 100. The clock manager 115 may also control clock gating of the SoC 100.

The PG manager 116 controls power gating of the SoC 100. Therefore, power consumption wasted by an unused module may be prevented. According to whether to apply determined power gating, the PG manager 116 may control the clock manager 115 to transmit a clock signal to some or all of at least one module 151 of the main controller 150.

The main controller 150 controls the overall operation of the electronic device 1000. For example, the main controller 150 may include at least one module 151 and a CPU 153. The main controller 150 may execute various types of application programs by using the modules 151 and the CPU 153. According to an exemplary embodiment, the main controller 150 may execute an operating system (OS) of the SoC 100 by using the transmitted power and the clock signal. Examples of an OS in a mobile device may include ANDROID®, TIZEN®, and the like.

The low power controller 110 may be controlled by the main controller 150, and thus may apply an existing DVFS control method and control a wakeup method for an event according to a state of a current device. For example, in general, the low power controller 110 may wake up the main controller 150 in response to all of events X, Y, and Z. However, if a battery is low, or there is setting of a user, the event Z may be ignored.

According to an exemplary embodiment, the wakeup controller 113 may determine whether the power transmitted to the main controller 150 is stabilized so as to have a starting voltage. If it is determined that the power of the main controller 150 is stabilized, the wakeup controller 113 transmits a clock signal having a starting clock frequency and a power gating signal to the main controller 150.

Through the SoC 100 as described above, a function that is frequently used in various types of mobile devices including a wearable device may start at a low power so as to provide a long available time of a mobile device to the user.

Figure 5:
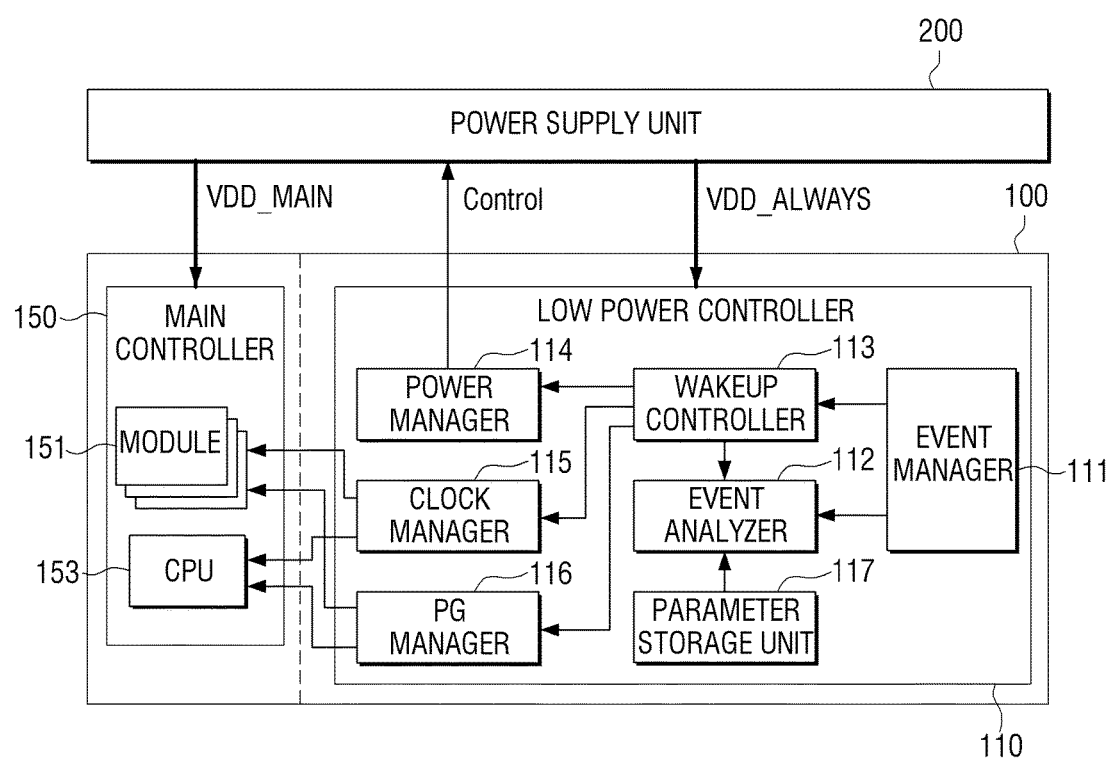
FIG. 5 is a detailed block diagram of a structure of an SoC according to an exemplary embodiment.

FIG. 5 is a detailed block diagram of a structure of a SoC 100, according to an exemplary embodiment. Referring to FIG. 5, the SoC 100 includes: a low power controller 110 including an event manager 111, an event analyzer 112, a wakeup controller 113, a power manager 114, a clock manager 115, a PG manager 116, and a parameter storage unit 117; and a main controller 150. Elements of the SoC 100 may be realized as additional modules or circuits.

Elements of the SoC 100 except the main controller 150 are supplied with power from a power supply unit 200 at all times. Since power keeps an ON state, the other part except the main controller 150 may be referred to as "Always On Event Driven Power Manager". In an exemplary embodiment, this is defined as the low power controller 110. In response to this, the main controller 150 may be referred to as an application performer.

If an event occurs, the event manager 111 operates the wakeup controller 113. The event may designate a frequently used function as being executed in consideration of a characteristic of each electronic device 1000. For example, an event in a mobile device may be at least one selected from a timer event, a sensor event, a communication connection and a message event. The respective events will be described in detail later with reference to FIGS. 6A through 6D.

The event analyzer 112 determines a preset power level, a frequency, and a power gating module for an input event. For this, the event analyzer 112 may use information stored in the parameter storage unit 117.

The parameter storage unit 117 stores information preset for the event. According to an exemplary embodiment, the preset information may include at least one selected from a minimum voltage, a minimum frequency, information about whether to apply power gating, and information about whether to apply clock gating. According to another exemplary embodiment, the parameter storage unit 117 may store an event set by a user. The parameter storage unit 117 may also store information about a voltage, etc., corresponding to each event set by the user.

The wakeup controller 113 controls an overall operation when the SoC 100 starts. According to an exemplary embodiment the wakeup controller 113 finally determines a voltage and a frequency corresponding to an analyzed event. The wakeup controller 113 may control the power manager 114 to set the determined voltage to a starting voltage. Also, the wakeup controller 113 may control the clock manager 115 to set the determined frequency to a starting clock frequency and control the PG manager 116 to manage power gating according to a determined operation module. The wakeup controller 113 transmits a signal, such as power having a starting voltage, a starting clock frequency, power gating, or the like, to the main controller 150 to start the main controller 150.

The power manager 114 sets power on or off and sets a voltage of the SoC 100. For example, the power manager 114 may set the voltage, which is determined by the wakeup controller 113, to a voltage for starting the SoC 100. The power manager 114 may transmit a control signal for supplying power at the set voltage to the power manager 200.

The clock manager 115 controls a clock frequency of the SoC 100. When the load of a task that is to be processed by the SoC 100 is great, a clock frequency for an operation increases. For example, the clock manager 115 may set the frequency, which is determined by the wakeup controller 113, to a frequency for starting the SoC 100. The clock manager 115 may transmit a clock signal having the set frequency to the main controller 150. According to an exemplary embodiment, the clock manager 115 may or may not transmit the clock signal to the main controller 150 according to whether to apply clock gating.

The PG manager 116 controls power gating of the SoC 100. Therefore, power wasted by an unused module may be prevented. The PG manager 116 may control the clock manager 115 to transmit a clock signal to some or all of the at least one module 151 of the main controller 150 according to whether to apply the determined power gating.

The main controller 150 starts the SoC 100 and controls operations of various types of application programs. The main controller 150 may include at least one module 151 and a CPU 153. The main controller 150 may execute the application programs by using the modules 151 respectively necessary for the application programs. According to an exemplary embodiment, the main controller 150 may execute an OS of the SoC 100 by using the transmitted power and clock signal. In other words, the main controller 150 may execute the OS or the application programs by using power having a determined starting voltage and a clock signal having a starting frequency.

A representative event that may be applied to a mobile device will now be described with reference to FIGS. 6A through 6D. According to an exemplary embodiment, an event to which a power management method of the SoC 100 may be applied may be a function that is simple and frequently used.

FIG. 6A illustrates a timer event according to an exemplary embodiment. The timer event displays a time that is changed and corresponds to an event that enables the electronic device 1000 to execute only a small part of a whole time. For example, when the electronic device 1000 displays a time that moves from 11:59 to 12:00, the electronic device 1000 equally displays the time from 11:59:00 to 11:59:59 as 11:59. Therefore, the low power controller 110 does not need to start the main controller 150. The low power controller 110 may start the main controller 150 so as to enable the main controller 150 to perform a function of changing the time at 12:00:00. The function of changing the time is a repeated operation, i.e., an event that has a less need to start the main controller 150 and then pass a determination process in an OS as in a related art. Therefore, if it is determined that a timer event occurs, the low power controller 110 may transmit a preset voltage and a clock frequency control signal to the main controller 150 so as to enable the main controller 150 to set a voltage and a frequency necessary for changing the time and perform the function without passing the determination process of the OS.

FIG. 6B illustrates a message event according to an exemplary embodiment. For example, if the electronic device 1000 receives a message, the electronic device 1000 may turn on a screen to display the message in a pop-up form. As the type of message applications is diversified, and as uses of the message application by users are popularized, a message event frequently occurs in the electronic device 1000 that is recently developed, in particular, in a mobile device such as a smartphone or the like. Therefore, the low power controller 110 may determine a voltage and a clock frequency necessary for displaying the message in the pop-up form and transmit the voltage and the clock frequency to the main controller 150. As described with reference to FIG. 6B, the message is displayed only in the pop-up form. However, an icon that notifies a reception of a message may be displayed on a side of a display (e.g., on a top of the screen).

FIG. 6C illustrates a communication connection event according to an exemplary embodiment. For example, the electronic device 1000 may be connected to another electronic device through BLUETOOTH®. Besides this, an event that pops up a message for notifying finding of WIFI® that is connectable or a message for notifying a possibility of being connectable to a wireless communication network such as an LTE® communication network or the like may be an example of a communication linkage event.

FIG. 6D illustrates a sensor event according to an exemplary embodiment. A wearable device includes a sensor such as gyro sensor to sense a rotation or the like of the electronic device 1000. Therefore, if it is determined that a user looks at a screen of the electronic device 1000, the wearable device performs an event for turning on a display screen. Since an initial screen has only to be first displayed, performing of the determination process of the OS is inefficient.

Through the SoC 100 as described above, if a task is processed that operates within a short time and is frequently processed, a consumed current may be reduced. Therefore, a use time of an electronic device such as a mobile device may be maximized.

The electronic device 1000 according to an exemplary embodiment includes the power supply unit 200 that supplies power to the SoC 100 that controls the electronic device 1000. The SoC 100 includes: the low power controller 110 including the event manager 111 that receives an event from an external source, the event analyzer 112 that analyzes an event content, the wakeup controller 113 that manages overall settings and starting of the main controller 150, the power manager 114 that sets power on or off and sets a voltage, the clock manager 115 that controls a clock frequency, the PG manager 116 that controls power gating, and the parameter storage unit 117 that stores operation conditions such as a starting voltage level, a frequency, etc.; and the main controller 150 that includes the at least one module 151 and the CPU 153. If an event is input into the event manager 111, the wakeup controller 113 controls the power manager 114 to analyze the received event, determine a voltage and a frequency corresponding to the analyzed event, and set the determined voltage to a starting voltage, controls the clock manager 115 to set the determined frequency to a starting clock frequency, and controls the PG manager 116 to manage power gating according to a determined operation module. The low power controller 110 may transmit power having a starting voltage and a clock signal having a starting clock frequency to the main controller 150 to start the main controller 150. Descriptions of the electronic device 1000 overlap with the above-descriptions of the SoC 100 and the power supply unit 200 and thus are omitted herein.

Methods of managing power of the SoC 100 according to an exemplary embodiment will now be described with reference to FIGS. 7 and 8.

FIG. 7 is a flowchart of a method of managing power of the SoC 100 according to an exemplary embodiment. In operation S710, the SoC 100 analyzes an event input from an external source. For example, the SoC 100 may pre-store information preset for the event and analyze the input event by using the stored preset information. In this case, the event may be at least one selected from a timer event, a sensor event, a communication connection event, and a message event. Besides these events, an event that operates an operation designated by a user may be set. Here, the preset information may be information about a voltage and a frequency necessary for performing an operation corresponding to each input event, whether to apply power gating, and whether to apply clock gating. In operation S720, the SoC 100 determines a voltage and a frequency corresponding to the input event.

In operation S730, the SoC 100 respectively sets the determined voltage and frequency to a starting voltage and a starting clock frequency. In operation S740, the SoC 100 starts a main controller at the starting voltage and the starting clock frequency. For example, the main controller may start at the starting voltage and the starting clock frequency to execute an OS of the SoC 100.

FIG. 8 is a flowchart of a method of managing power of the SoC 100 according to another exemplary embodiment. In operation S810, the SoC 100 analyzes an event input from an external source, by using preset information. According to another exemplary embodiment, the SoC 100 may first store the information preset for the event. The preset information may include a minimum voltage and a minimum frequency necessary for performing an operation corresponding to each event. In addition, the preset information may include information about whether to apply clock gating and power gating.

In operation S820, the SoC 100 determines a starting voltage, a starting clock frequency, and whether to apply power gating, by using information about the analyzed event. In operation S830, the SoC 100 starts a main controller at the determined starting voltage. In operation S840, the SoC 100 determines whether a voltage is stabilized. This is to transmit a clock signal after the voltage is stabilized. If it is determined in operation S840 that the voltage is not stabilized, the SoC 100 does not transmit the clock signal and stands by until the voltage is stabilized.

If it is determined in operation S840 that the voltage is stabilized, the SoC 100 determines whether to apply power gating in operation S850. The SoC 100 may apply the power gating to transmit a clock signal only to a module necessary for performing each event. If it is determined in operation S850 that the power gating is not applied, the SoC 100 transmits a clock signal to a CPU and all modules of a main controller in operation S870. If it is determined in operation S850 that the power gating is applied, the Soc 100 transmits a clock signal only to a module necessary for a CPU of a main controller and an operation in operation S860. For example, if a message event is input, the SoC 100 may receive a message and transmit the clock signal only to a module that performs an operation of displaying the message in a pop-up window.

Lastly, the main controller of the SoC 100 executes an OS of the SoC 100 by using the transmitted power and clock signal.

Through a method of managing power of the SoC 100 according to an exemplary embodiment, there may be provided an electronic device that may automatically set power and an operation frequency, etc., for a predefined particular event through the low power controller 110 to wake up a processor without an intervention of an OS.

A program code for performing the method of managing the power of the SoC 100 according to the above-described exemplary embodiments may be stored on various types of recording media. In detail, the program code may be stored on various types of non-transitory computer-readable recording media such as a random access memory (RAM), a flash memory, a read only memory (ROM), an erasable programmable ROM (EPROM), an electronically erasable and programmable ROM (EEPROM), a register, a hard disc, a removable disc, a memory card, a universal serial bus (USB) memory, a compact disc (CD)-ROM, etc.

The non-transitory computer readable medium is a medium which does not store data temporarily such as a register, cash, and memory, but stores data semi-permanently and is readable by devices. More specifically, the aforementioned applications or programs may be stored in the non-transitory computer readable media such as compact disks (CDs), digital video disks (DVDs), hard disks, BLU-RAY DISKS®, universal serial buses (USBs), memory cards, and read-only memory (ROM).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A system on chip (SoC) powered by a power supply unit, comprising:
an event manager configured to receive an event from an external source;
an event analyzer configured to analyze the event received by the event manager to identify a voltage, a frequency, and power gating corresponding to the analyzed event;
a power manager configured to set power on or off, and to set a starting voltage;
a clock manager configured to set a starting clock frequency;
a power gating (PG) manager configured to set a power gating;
a main controller comprising at least one module and a central processing unit (CPU); and
a wakeup controller configured to control the power manager to set the starting voltage to the identified voltage, to control the clock manager to set the starting clock frequency to the identified frequency, to control the PG manager to set the power gating to the identified power gating, to transmit a clock signal having the starting clock frequency to the main controller, to transmit a control signal to the power supply unit, the control signal being configured to control the power supply unit to supply power having the starting voltage to the main controller, and to start the main controller by transmitting a power gating signal corresponding to the identified power gating to the main controller,
wherein a module corresponding to the event from among the at least one module, is powered by the power supply unit, based on the power gating signal, and
wherein the wakeup controller is configured to identify whether the power supplied to the main controller is stabilized with the starting voltage and, in response to identifying that the power is stabilized with the starting voltage, transmit the clock signal having the starting clock frequency to the main controller.

2. The SoC of claim 1, further comprising:
a parameter storage unit configured to store preset information,
wherein the event analyzer is configured to analyze the event by using the preset information stored in the parameter storage unit.

3. The SoC of claim 2, wherein the preset information comprises at least one selected from a minimum voltage, a minimum frequency, and power gating for performing an operation corresponding to each event.

4. The SoC of claim 1, wherein the event is at least one selected from a timer event, a sensor event, a communication connection event, and a message event.

5. The SoC of claim 1, wherein the main controller executes an operating system (OS) of the SoC by using the transmitted power and clock signal.

6. A method of managing power of a system on chip (SoC), the method comprising:
in response to an event being input from an external source, analyzing the input event to identify a voltage, a frequency, and power gating corresponding to the analyzed event;
setting a starting voltage to the identified voltage;
setting a starting clock frequency to the identified frequency;
setting a power gating to the identified power gating; and
starting a main controller by transmitting a control signal to a power supply unit, the control signal being configured to control the power supply unit to supply power having the starting voltage to the main controller;
identifying whether the power supplied to the main controller is stabilized with the starting voltage; and transmitting a clock signal having the starting clock frequency, and a power gating signal corresponding to the set power gating to the main controller, wherein the starting the main controller comprises supplying power to a module being required for the event from among a plurality of modules included in the main controller, based on the power gating signal, and wherein the transmitting the clock signal comprises in response to identifying that the power is stabilized with the starting voltage, transmitting the clock signal having the starting clock frequency to the main controller.

7. The method of claim 6, further comprising:
storing preset information,
wherein the analyzing the input event to determine the voltage, the frequency, and the power gating comprises analyzing the input event by using the stored preset information.

8. The method of claim 7, wherein the event is at least one selected from a timer event, a sensor event, a communication connection event, and a message event.

9. The method of claim 7, wherein the preset information comprises at least one selected from a minimum voltage, a minimum frequency, and power gating necessary for performing an operation corresponding to the input event.

10. The method of claim 6, wherein the starting of the main controller further comprises executing an OS of the SoC through the main controller by using the supplied power and the transmitted clock signal.

11. An electronic device comprising:
a power supply unit;
a system on chip (SoC), the SoC being configured to control the electronic device and comprising:
  an event manager configured to receive an event from an external source;
  an event analyzer configured to analyze the event received by the event manager to identify a voltage, a frequency, and power gating corresponding to the analyzed event;
  a power manager configured to set power on or off and to set a starting voltage;
  a clock manager configured to set a starting clock frequency;
  a power gating (PG) manager configured to set a power gating;
  a main controller configured to comprise at least one module and a CPU; and
  a wakeup controller configured to control the power manager to set the starting voltage to the identified voltage, to control the clock manager to set the starting clock frequency to the identified frequency, to control the PG manager to set the power gating to the identified power gating, to transmit a clock signal having the starting clock frequency to the main controller, transmit a control signal to the power supply unit, the control signal being configured to control the power supply unit to supply power having the starting voltage to the main controller, and start the main controller by transmitting a power gating signal corresponding to the set power gating to the main controller, wherein a module corresponding to the event from among the at least one module, is powered by the power supply unit, based on the power gating signal, and wherein the wakeup controller is configured to identify whether the power supplied to the main controller is stabilized with the starting voltage and, in response to identifying that the power is stabilized with the starting voltage, transmit the clock signal having the starting clock frequency to the main controller.

12. A method of managing power, comprising:
receiving a task request corresponding to a task, the task corresponding to a task voltage, a task clock frequency, a task clock gating, and a task power gating;
identifying, by a low power controller, the task voltage, the task clock frequency, the task clock gating, and the task power gating corresponding to the task;
waking, by the low power controller, a main controller from a system sleep state, the waking comprising:
  transmitting a control signal to a power supply unit, the control signal being configured to control the power supply unit to supply power having the task voltage to the main controller;
  transmitting a clock signal having the task clock frequency to the main controller;
  transmitting a clock gating signal corresponding to the task clock gating to the main controller;
  transmitting a power gating signal corresponding to the task power gating to the main controller; and
  supplying power to a module being required for performing the task from among a plurality of modules included in the main controller, based on the power gating signal;
identifying whether the power supplied to the main controller is stabilized so as to have the starting voltage, and
performing the task in accordance with the task voltage, the task clock frequency, the task clock gating, and the task power gating, wherein at least one of the task voltage, the task clock frequency, the task clock gating, and the task power gating corresponds to a minimum value for the performing the task, and wherein the clock gating signal is transmitted to the main controller based on the power supplied to the main controller being identified as being stabilized.

* * * * *